US 12,274,191 B2

(12) United States Patent
Morimoto et al.

(10) Patent No.: US 12,274,191 B2
(45) Date of Patent: Apr. 15, 2025

(54) TRAVEL CONTROL SYSTEM

(71) Applicant: Kubota Corporation, Osaka (JP)

(72) Inventors: Takanori Morimoto, Sakai (JP); Kotaro Yamaguchi, Sakai (JP); Ryota Kikuchi, Sakai (JP); Ken Sakuta, Sakai (JP); Fumiya Yoshimura, Sakai (JP)

(73) Assignee: Kubota Corporation, Osaka (JP)

( * ) Notice: Subject to any disclaimer, the term of this patent is extended or adjusted under 35 U.S.C. 154(b) by 363 days.

(21) Appl. No.: 17/896,255

(22) Filed: Aug. 26, 2022

(65) Prior Publication Data

US 2023/0069372 A1 Mar. 2, 2023

(30) Foreign Application Priority Data

Aug. 27, 2021 (JP) ................. 2021-139301

(51) Int. Cl.
G05D 1/00 (2024.01)
A01B 69/04 (2006.01)
(52) U.S. Cl.
CPC ......... *A01B 69/008* (2013.01); *G05D 1/0214* (2013.01); *G05D 1/0219* (2013.01); *G05D 1/0238* (2013.01)
(58) Field of Classification Search
CPC .. A01B 69/008; G05D 1/0214; G05D 1/0219; G05D 1/0238
See application file for complete search history.

(56) References Cited

U.S. PATENT DOCUMENTS

2018/0209799 A1* 7/2018 Uoya ................... G05D 1/0212

FOREIGN PATENT DOCUMENTS

CN 111345146 B * 3/2023 ............. A01B 49/04
JP 2018116606 A 7/2018
WO WO-2017195510 A1 * 11/2017 ............... G05D 1/02

* cited by examiner

*Primary Examiner* — Vivek D Koppikar
*Assistant Examiner* — Jeffrey R Chalhoub
(74) *Attorney, Agent, or Firm* — The Webb Law Firm

(57) ABSTRACT

A travel control system includes a permission unit that permits outermost periphery automatic traveling if predetermined permission conditions are satisfied. The permission conditions include a first condition and a second condition. The first condition is that a reference value corresponding to a working width W1 of a work device 30 is larger than a lateral width W2 of the work device. The second condition is that the reference value is larger than a threshold value determined by a threshold value determination unit. The threshold value determination unit determines the threshold value based on a reference distance D1 between a front end position of a work vehicle 1 and a reference position SP at which the work device 30 is switched from a working state to a non-working state.

20 Claims, 6 Drawing Sheets

TRAVEL CONTROL SYSTEM

CROSS-REFERENCE TO RELATED APPLICATION

This application claims priority to Japanese Patent Application No. 2021-139301 filed Aug. 27, 2021, the disclosure of which is hereby incorporated by reference in its entirety.

BACKGROUND OF THE INVENTION

1. Field of the Invention

The present invention relates to a travel control system that controls automatic travel of a work vehicle that includes a work device.

2. Description of the Related Art

JP 2018-116606A discloses a known example of the aforementioned travel control system. This travel control system is configured to control automatic travel of a tractor.

JP 2018-116606A is an example of related art.

In the case where an agricultural field is surrounded by ridges, while a work vehicle travels in an outermost peripheral region, which is the region at the outermost periphery in the agricultural field, the work vehicle needs to travel so as to not come into contact with the ridges. For this reason, it is more difficult to appropriately perform work traveling by automatic travel in the outermost peripheral region of the agricultural field than in the region inward of the outermost peripheral region.

For this reason, conventional travel control systems are often configured such that automatic travel is not executed in the outermost peripheral region.

SUMMARY OF THE INVENTION

An object of the present invention is to provide a travel control system in which automatic travel can be executed in the outermost peripheral region under the condition that automatic travel is likely to be performed appropriately in the outermost peripheral region.

One aspect of the present invention is a travel control system that controls automatic travel of a work vehicle that includes a work device, the work vehicle being configured to perform outermost periphery traveling by automatic travel, the outermost periphery traveling being work traveling performed along an outer shape of an agricultural field in an outermost peripheral region of the agricultural field, and the outermost periphery traveling including first traveling for traveling in a first direction while driving the work device, second traveling for traveling in a second direction while driving the work device, and a direction change operation that is performed between the first traveling and the second traveling and is performed to change a direction of the work vehicle from the first direction to the second direction, the travel control system including: a permission unit configured to permit outermost periphery automatic traveling, which is the outermost periphery traveling performed by automatic travel, in response to at least one predetermined permission condition being satisfied; a prohibition unit configured to prohibit the outermost periphery automatic traveling in response to the permission unit not permitting the outermost periphery automatic traveling; and a threshold value determination unit, wherein the at least one permission condition includes a first condition and a second condition, the first condition is that a reference value corresponding to a working width of the work device is larger than a lateral width of the work device, the second condition is that the reference value is larger than a threshold value determined by the threshold value determination unit, and the threshold value determination unit is configured to determine the threshold value based on a reference distance between a front end position of the work vehicle and a reference position at which the work device is switched from a working state to a non-working state.

According to this configuration, if the reference value is larger than the lateral width of the work device, and furthermore the reference value is larger than the threshold value, outermost periphery automatic traveling is permitted.

If the reference value is larger than the lateral width of the work device, it is unlikely that the work device will travel out of the agricultural field and come into contact with a ridge when turning in a corner of the agricultural field. Also, if the reference value is larger than the threshold value, it is unlikely that an unworked region will appear between the region where work is performed in first traveling and the region where work is performed in second traveling.

Accordingly, if the first condition and the second condition are satisfied, it is likely that automatic travel can be performed in the outermost peripheral region without the work device traveling out of the agricultural field and coming into contact with a ridge when turning in a corner of the agricultural field, and without an unworked region appearing between the region where work is performed in first traveling and the region where work is performed in second traveling. In other words, if the first condition and the second condition are satisfied, automatic travel is likely to be performed appropriately in the outermost peripheral region.

Accordingly, with the above configuration, outermost periphery automatic traveling is permitted under the condition that automatic travel is likely to be performed appropriately in the outermost peripheral region. In other words, according to the above configuration, it is possible to realize a travel control system in which automatic travel in the outermost peripheral region can be executed under the condition that automatic travel is likely to be performed appropriately in the outermost peripheral region.

Furthermore, in the present invention, it is preferable that the work vehicle includes a sensor configured to detect an obstacle in front of a body of the work vehicle, and the threshold value determination unit determines the threshold value based also on a detection range of the sensor.

According to this configuration, the threshold value is more likely to be determined appropriately than in the case where the threshold value is determined without using the detection range of the sensor. As a result, the permission condition is likely to be appropriate.

Furthermore, in the present invention, it is preferable that the sensor is switchable between an enabled state and a disabled state, in response to the sensor being in the enabled state, the threshold value determination unit determines the threshold value based also on the detection range of the sensor, and in response to the sensor being in the disabled state, the threshold value determination unit determines the threshold value without using the detection range of the sensor.

According to this configuration, it is possible to realize a configuration in which the threshold value changes depending on whether or not the sensor is enabled. Accordingly, the permission condition is likely to be appropriate both when the sensor is enabled and when the sensor is disabled.

Furthermore, in the present invention, it is preferable that the threshold value determination unit determines the threshold value based also on a turning radius of the work vehicle.

According to this configuration, the threshold value can be determined to be the sum of the reference distance and a value determined with consideration given to the turning radius, for example. In this way, if the threshold value is determined based also on the turning radius, it is possible to realize a configuration in which if the second condition is satisfied, space in which the direction change operation (turning) can be performed smoothly is ensured in front of the body at the end of the first traveling. Accordingly, it is possible to realize a configuration in which the direction change operation (turning) can be performed smoothly if the permission condition is satisfied.

Furthermore, in the present invention, it is preferable that the work vehicle is configured to switch a drive mode of a travel device employed during turning, and the threshold value determination unit determines the threshold value based also on the drive mode.

In general, when the drive mode of the travel device employed during turning changes, the turning radius changes.

Here, according to the above configuration, the threshold value can be determined to be the sum of the reference distance and a value determined with consideration given to the drive mode of the travel device employed during turning, for example. In this way, if the threshold value is determined based on the drive mode of the travel device employed during turning as well, it is possible to realize a configuration in which the threshold value increases as the turning radius increases. As a result, it is possible to realize a configuration in which if the second condition is satisfied, space in which the direction change operation (turning) can be performed smoothly is ensured in front of the body at the end of the first traveling. Accordingly, it is possible to realize a configuration in which the direction change operation (turning) can be performed smoothly if the permission condition is satisfied.

Furthermore, in the present invention, it is preferable that the travel control system further includes: an overlap width determination unit configured to determine an overlap width that is a width of an overlap portion of a region where work is performed by the first traveling during the outermost periphery automatic traveling and a region where work is performed by the second traveling during the outermost periphery automatic traveling; and a reference value determination unit configured to determine the reference value, wherein the reference value determination unit determines a value obtained by subtracting the overlap width from the working width of the work device as the reference value.

According to this configuration, the reference value is more likely to be determined appropriately than in the case where the working width of the work device is determined as the reference value. As a result, the permission condition is likely to be appropriate.

BRIEF DESCRIPTION OF THE DRAWINGS

FIG. 3 is a diagram showing a reference distance and the like.

FIG. 4 is a block diagram showing a configuration of a control unit and the like.

DESCRIPTION OF THE INVENTION

Modes for carrying out the present invention will be described below with reference to the drawings. Note that in the following description, an arrow N shown in FIGS. 2 and 3 indicates the "north" direction, an arrow S indicates the "south" direction, an arrow E indicates the "east" direction, and an arrow W indicates the "west" direction.

Configuration of Tractor

Figure 1:
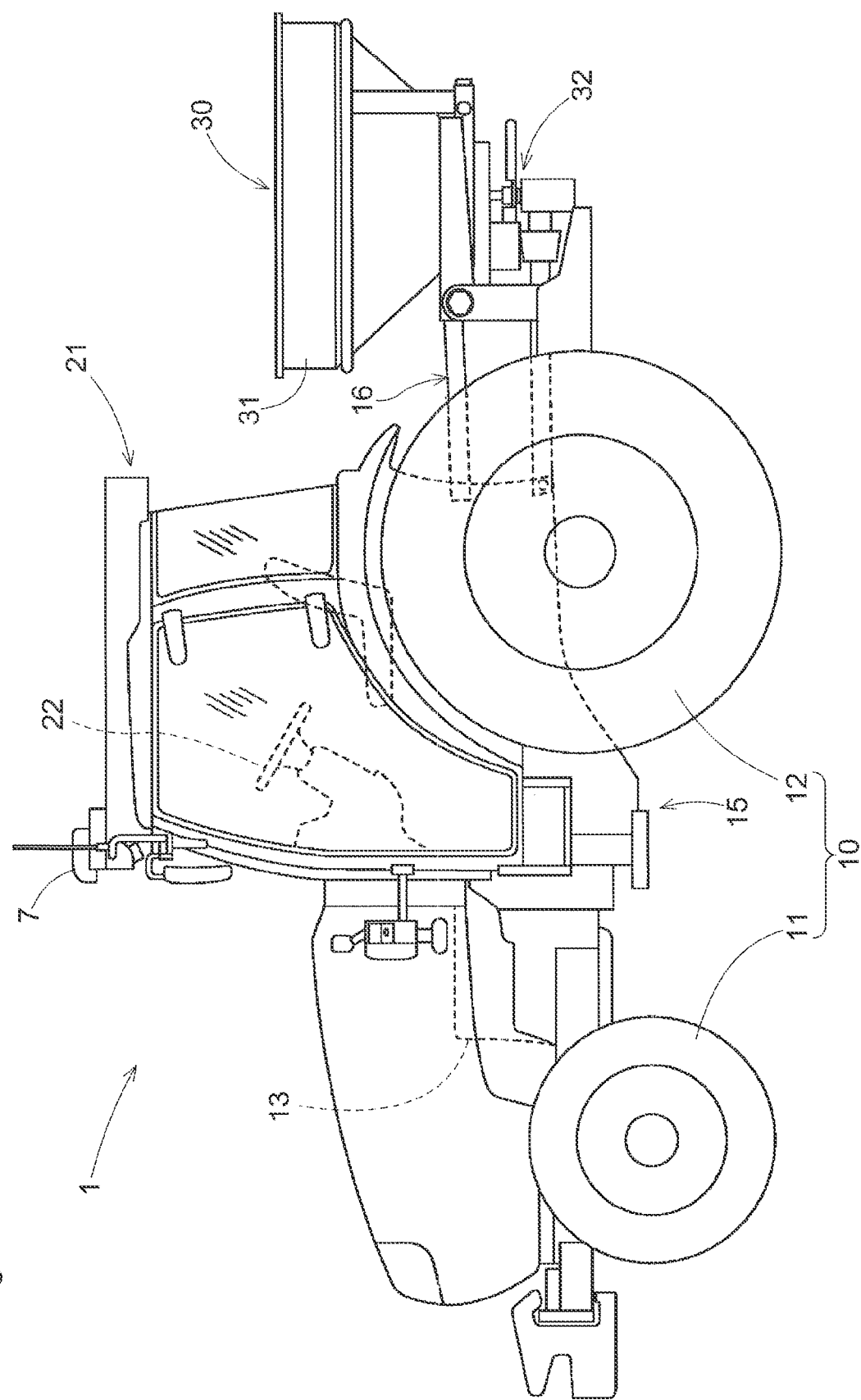
FIG. 1 is a left side view of a tractor.

As shown in FIG. 1, a tractor 1 (corresponding to a "work vehicle" pertaining to the present invention) includes a travel device 10, a motor 13, and a transmission 15. The travel device 10 includes left and right front wheels 11 and left and right rear wheels 12.

The motor 13 is constituted by a diesel engine, an electric motor, or the like. The transmission 15 can adjust the propulsive force of the travel device 10 by shifting gears, and can switch between forward and reverse travel of the travel device 10.

The tractor 1 also includes a cabin 21. A driver compartment is formed in the cabin 21.

An elevating device 16 constituted by a three-point link mechanism or the like is provided in a rear section of the tractor 1. The elevating device 16 is provided with a fertilizer spraying device 30 (corresponding to a "work device" pertaining to the present invention) for spraying fertilizer.

The fertilizer spraying device 30 includes a container 31 capable of storing fertilizer and a supply mechanism 32 for supplying the fertilizer stored in the container 31 to the agricultural field.

The front wheels 11 function as steering control wheels. The traveling direction of the tractor 1 is changed by changing the steering angle of the front wheels 11. Here, the tractor 1 is configured to be capable of automatic travel. The steering angle of the front wheels 11 in automatic travel can be controlled via an electric steering mechanism (not shown). During manual travel, the front wheels 11 are steered by operating a steering wheel 22 disposed in the driver compartment.

Agricultural Field Work

Figure 2:
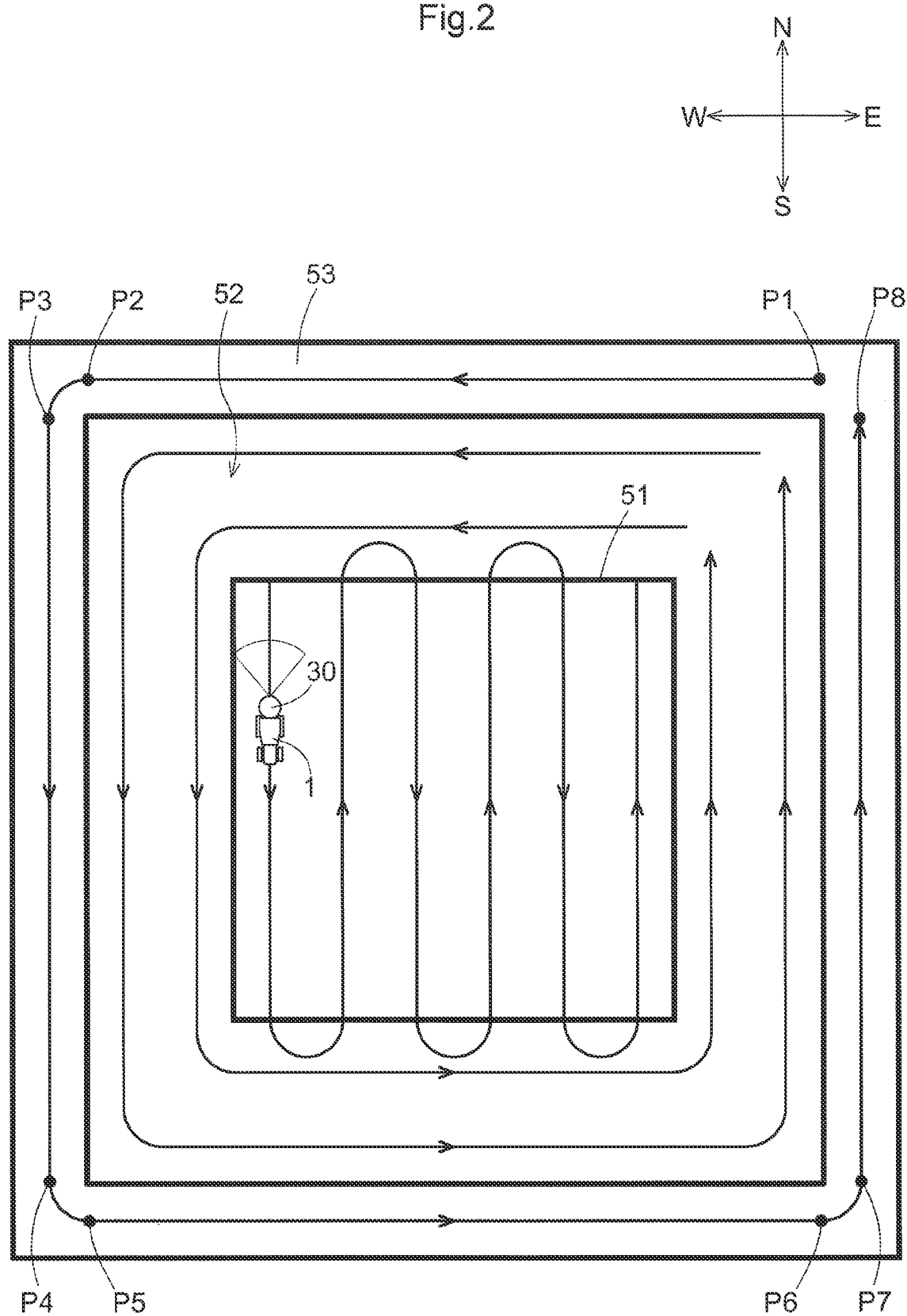
FIG. 2 is a diagram showing work traveling in an agricultural field.

As shown in FIG. 2, the tractor 1 is configured to perform work traveling by traveling back and forth in a central region 51 in the agricultural field. Also, the tractor 1 is configured to perform work traveling by traveling in loops in an outer peripheral region 52 in the agricultural field. Note that work traveling means traveling while work is performed by the work device. In the present embodiment, work traveling means traveling while fertilizer is sprayed by the fertilizer spraying device 30.

The central region 51 is the region located in the central portion of the agricultural field. The outer peripheral region 52 is a region located in the outer peripheral portion of the agricultural field.

In the example shown in FIG. 2, in the case where work traveling is to be performed in the central region 51, the tractor 1 starts the work traveling from the north end position at the west end portion of the central region 51 and travels south. The tractor 1 then repeatedly performs straight traveling in a straight line along the north-south direction and makes a U-turn. Work in the entirety of the central region 51 is complete when the work traveling in the east end portion of the central region 51 is complete.

Note that the straight traveling along the north-south direction is performed while driving the fertilizer spraying device 30. In other words, the fertilizer spraying device 30 is in the working state during the straight traveling along the north-south direction. Also, "straight traveling" in the present specification does not mean only traveling with a strictly straight traveling path, and includes traveling in a substantially straight light even if meandering or turning is somewhat included. Also, instead of the "straight traveling" in the present embodiment, substantially curved traveling, zigzag traveling, or the like may be performed.

Also, the driving of the fertilizer spraying device 30 is stopped while U-turn traveling is performed. In other words, during U-turn traveling, the fertilizer spraying device 30 is in the non-working state.

In the example shown in FIG. 2, when the work traveling in the outer peripheral region 52 is performed, the tractor 1 travels in three loops from the inward side of the outer peripheral region 52 toward the outward side. Note that the present invention is not limited to this, and two or fewer loops or four or more loops may be traveled in the outer peripheral region 52.

As shown in FIG. 2, the outer peripheral region 52 includes an outermost peripheral region 53. The outermost peripheral region 53 is the region located at the outermost periphery of the outer peripheral region 52. The tractor 1 is configured to be able to perform outermost periphery traveling. This outermost periphery traveling is work traveling performed along the outer shape of the agricultural field in the outermost peripheral region 53 of the agricultural field.

In the example shown in FIG. 2, the outermost periphery traveling is work traveling for traveling counterclockwise along the outer shape of the agricultural field from a first point P1, passing through a second point P2, a third point P3, a fourth point P4, a fifth point P5, a sixth point P6, and a seventh point P7, and then arriving at an eighth point P8.

Traveling from the first point P1 to the second point P2, from the third point P3 to the fourth point P4, from the fifth point P5 to the sixth point P6, and from the seventh point P7 to the eighth point P8 is straight traveling, and is performed while driving the fertilizer spraying device 30. In other words, the fertilizer spraying device 30 is in the working state during such traveling.

The traveling from the second point P2 to the third point P3, from the fourth point P4 to the fifth point P5, and from the sixth point P6 to the seventh point P7 is direction change traveling (turn traveling) in which the driving of the fertilizer spraying device 30 is stopped. In other words, the fertilizer spraying device 30 is in the non-working state during such traveling.

The outermost periphery traveling includes first traveling, second traveling, and a direction change operation. The first traveling is traveling in a first direction while driving the work device. The second traveling is traveling in a second direction while driving the work device. The direction change operation is performed between the first traveling and the second traveling, and is an operation for changing the direction of the tractor 1 from the first direction to the second direction. Note that the work device in the present embodiment is specifically the fertilizer spraying device 30.

In other words, the outermost periphery traveling includes the first traveling for traveling in the first direction while driving the fertilizer spraying device 30, the second traveling for traveling in the second direction while driving the fertilizer spraying device 30, and the direction change operation that is performed between the first traveling and the second traveling to change the direction of the tractor 1 from the first direction to the second direction.

In the following description, the traveling from the first point P1 to the second point P2 is the "first traveling", the traveling from the third point P3 to the fourth point P4 is the "second traveling", and the traveling from the second point P2 to the third point P3 is the "direction change operation". In this case, the west direction is the "first direction", and the south direction is the "second direction".

However, the present invention is not limited to this. The traveling that corresponds to the "first traveling" may be the traveling from the third point P3 to the fourth point P4, or may be the traveling from the fifth point P5 to the sixth point P6, for example. This similarly applies to the "second traveling", the "direction change operation", the "first direction", and the "second direction", which are not limited to the following description.

Figure 3:
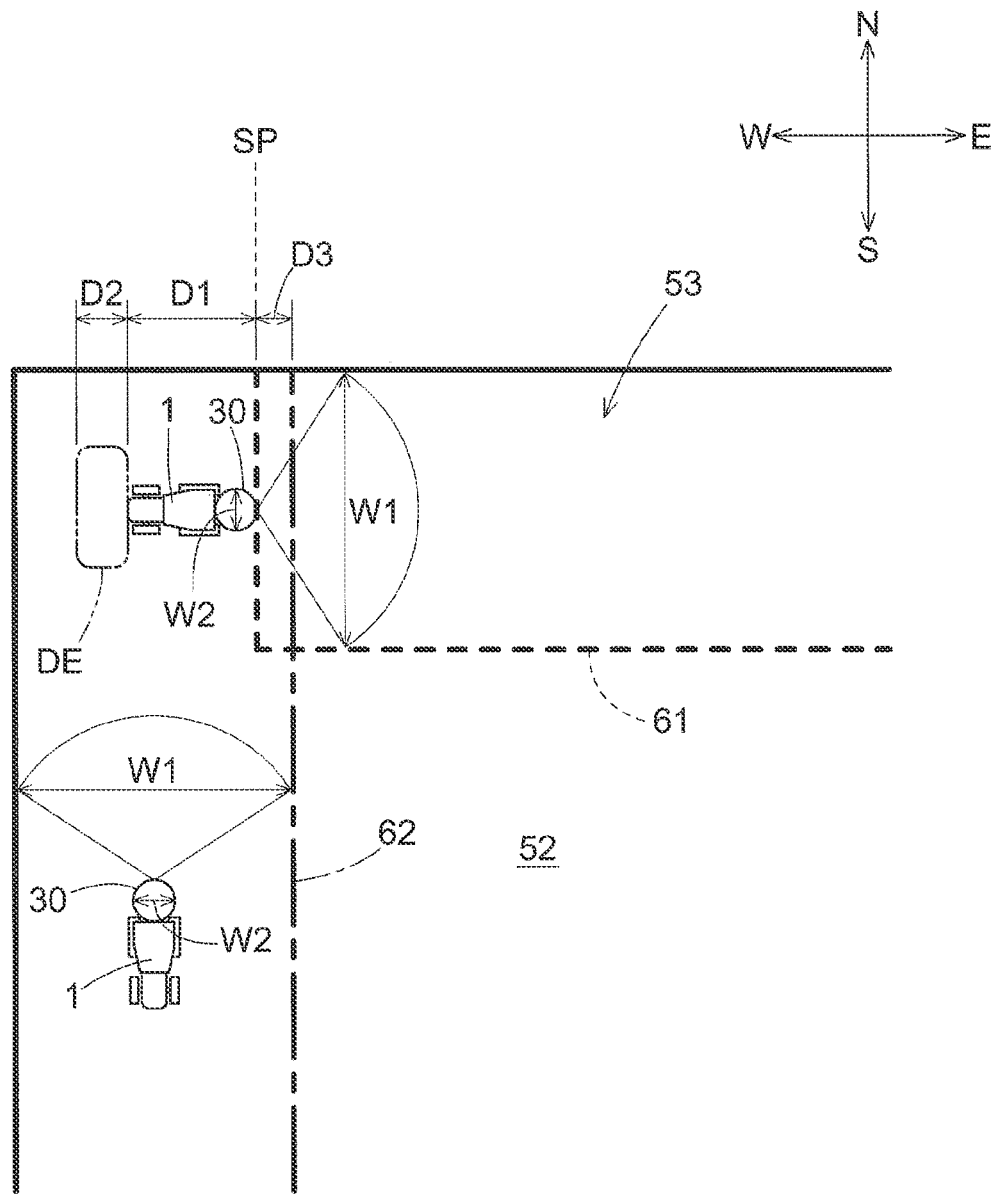

FIG. 3 shows an enlarged view of a northwestern portion of the agricultural field shown in FIG. 2. Note that the second point P2 and the third point P3 are not shown in FIG. 3.

Also, FIG. 3 shows a first work region 61 and a second work region 62. The first work region 61 is a region where work is performed in the first traveling. The second work region 62 is a region where work is performed in the second traveling. As shown in FIG. 3, the first work region 61 and the second work region 62 partially overlap each other.

Also, as shown in FIGS. 2 and 3, the fertilizer spraying device 30 sprays fertilizer rearward from the body. The spraying range of the fertilizer sprayed by the fertilizer spraying device 30 is fan-shaped in a plan view. As shown in FIG. 3, the width of the fertilizer spraying range of the fertilizer spraying device 30 is a working width W1 of the fertilizer spraying device 30.

Automatic Travel

Figure 4:
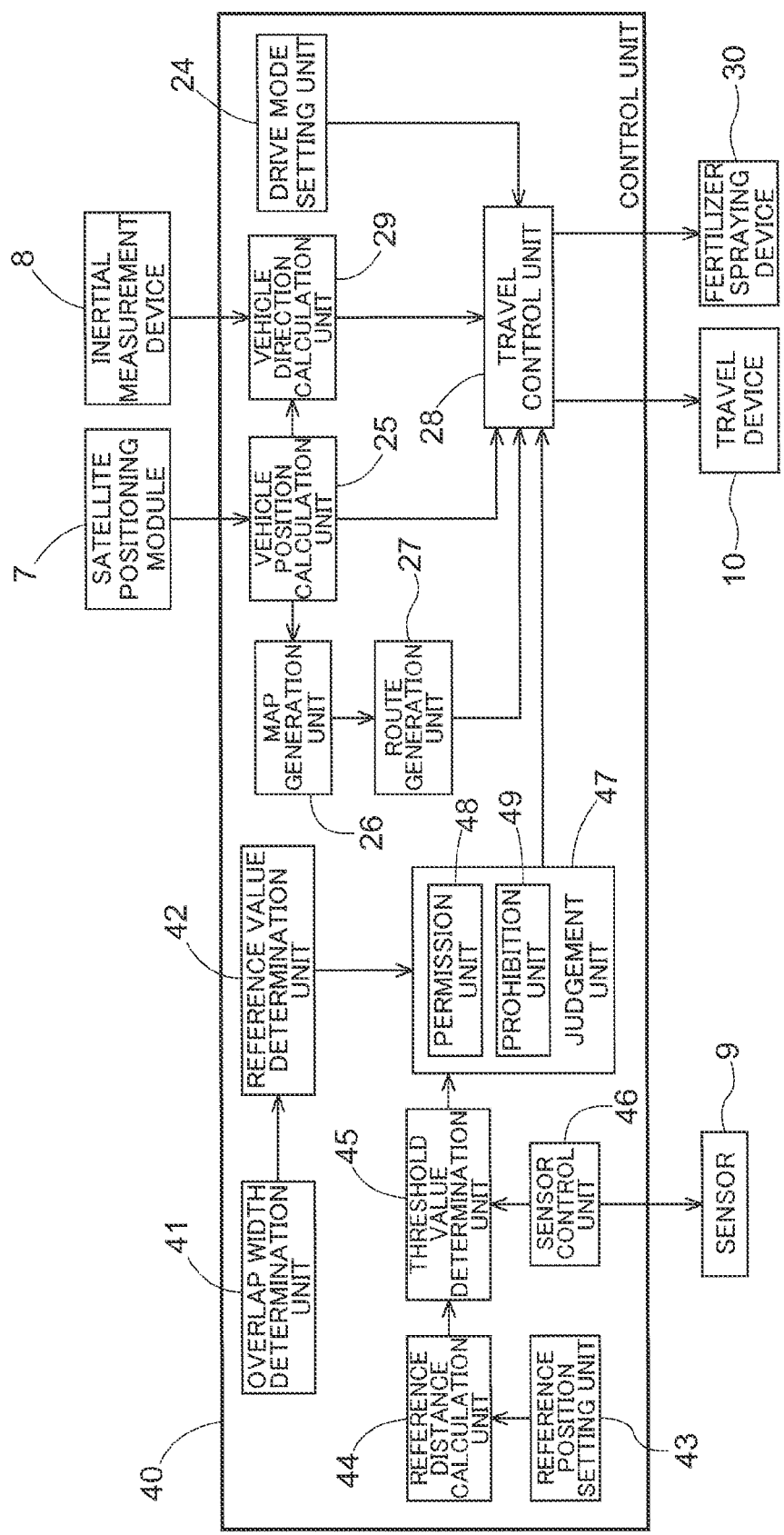

As shown in FIG. 4, the tractor 1 includes a control unit 40 (corresponding to the "travel control system" pertaining to the present invention). Automatic travel of the tractor 1 is controlled by the control unit 40. The tractor 1 is configured such that the work traveling in the central region 51 and the working traveling in the outer peripheral region 52 can be performed by automatic travel under control of the control unit 40. In particular, the tractor 1 is configured such that the outermost periphery traveling can be performed by automatic travel.

In other words, the control unit 40 controls automatic travel of the tractor 1 that includes the fertilizer spraying device 30. Also, the tractor 1 is configured such that the outermost periphery traveling, which is work traveling performed along the outer shape of the agricultural field in the outermost peripheral region 53 of the agricultural field, can be performed by automatic travel.

As shown in FIG. 4, the control unit 40 includes a vehicle position calculation unit 25. Also, as shown in FIGS. 1 and 4, the tractor 1 includes a satellite positioning module 7. The satellite positioning module 7 is attached to an upper portion of the cabin 21. The satellite positioning module 7 receives GPS (Global Positioning System) signals from artificial satellites used in GPS. As shown in FIG. 4, the satellite positioning module 7 sends positioning data indicating the vehicle position of the tractor 1 to the vehicle position calculation unit 25 based on the received GPS signals.

Note that the present invention is not limited to this. The satellite positioning module 7 does not need to use GPS. For example, besides GPS, the satellite positioning module 7 may use another type of GNSS (e.g., GLONASS, Galileo, Michibiki, or BeiDou).

The vehicle position calculation unit 25 calculates the position coordinates of the tractor 1 over time based on the positioning data output by the satellite positioning module 7. As a result, the vehicle position calculation unit 25 acquires the position coordinates of the tractor 1.

Also, as shown in FIG. 4, the tractor 1 includes an inertial measurement device 8. Also, the control unit 40 includes a vehicle direction calculation unit 29.

The inertial measurement device 8 detects, over time, the angular velocity of the yaw angle of the body of the tractor 1 as well as the acceleration in three axial directions orthogonal to each other. The detection results obtained by the inertial measurement device 8 are sent to the vehicle direction calculation unit 29.

The vehicle direction calculation unit 29 receives the position coordinates of the tractor 1 from the vehicle position calculation unit 25. The vehicle direction calculation unit 29 calculates the attitude/heading of the tractor 1 based on the detection results from the inertial measurement device 8 and the position coordinates of the tractor 1.

More specifically, first, while the tractor 1 is traveling, the vehicle direction calculation unit 29 calculates an initial attitude/heading based on the current position coordinates of the tractor 1 and the position coordinates of the tractor 1 at the point where the tractor 1 was traveling immediately previously. Next, after the tractor 1 has traveled for a certain period of time after calculation of the initial attitude/heading, the vehicle direction calculation unit 29 calculates the amount of change in the attitude/heading by integrating the angular velocity detected by the inertial measurement device 8 during the traveling in the certain period of time.

Then, by adding the amount of change in the attitude/heading calculated in this way to the initial attitude/heading, the vehicle direction calculation unit 29 updates the calculation result for the attitude/heading. Subsequently, the amount of change in the attitude/heading is calculated in the same manner at a regular time interval, and the calculation result for the attitude/heading is sequentially updated.

According to the above configuration, the vehicle direction calculation unit 29 calculates the attitude/heading of the tractor 1.

As shown in FIG. 4, the control unit 40 includes a map generation unit 26. The map generation unit 26 receives the time-series position coordinates of the tractor 1 from the vehicle position calculation unit 25. The map generation unit 26 generates data indicating the outer shape of the central region 51 and data indicating the outer shape of the outer peripheral region 52 based on the time-series position coordinates of the tractor 1.

More specifically, before automatic travel is performed in the agricultural field, a worker manually drives the tractor 1 in a loop in the outermost peripheral region 53. The map generation unit 26 generates data indicating the outer shape of the agricultural field and data indicating the outer shape of the central region 51 based on the time-series position coordinates of the tractor 1 in this traveling in a loop. The map generation unit 26 then generates data indicating the outer shape of the outer peripheral region 52 based on the data indicating the outer shape of the agricultural field and the data indicating the outer shape of the central region 51.

As shown in FIG. 4, the control unit 40 includes a route generation unit 27. The route generation unit 27 receives the data indicating the outer shape of the central region 51 and the data indicating the outer shape of the outer peripheral region 52 from the map generation unit 26. The route generation unit 27 generates target routes for automatic travel based on the received data. In the example shown in FIG. 2, the target routes generated by the route generation unit 27 are indicated by arrows.

A target route for performing work traveling in the central region 51 and a target route for performing work traveling in the outer peripheral region 52 are shown in the example shown in FIG. 2. The target route for performing work traveling in the central region 51 is generated such that the tractor 1 performs back-and-forth traveling. The target route for performing work traveling in the outer peripheral region 52 is generated such that the tractor 1 performs loop traveling.

As shown in FIG. 4, the control unit 40 includes a travel control unit 28. During automatic travel of the tractor 1, the travel control unit 28 controls the traveling of the tractor 1 based on the position coordinates of the tractor 1 received from the vehicle position calculation unit 25, the attitude/heading of the tractor 1 received from the vehicle direction calculation unit 29, and the information indicating the target routes received from the route generation unit 27. More specifically, the travel control unit 28 controls the travel device 10 and the fertilizer spraying device 30 such that work traveling is performed by automatic travel along the target routes. At this time, the travel control unit 28 controls the traveling of the tractor 1 such that the satellite positioning module 7 is located on the target routes, for example.

In the present embodiment, an automatic travel start button (not shown) is provided in the driver compartment of the tractor 1. The tractor 1 is configured to start automatic travel when a worker operates the automatic travel start button.

Note that the control unit 40 and constituent elements, such as the travel control unit 28, included in the control unit 40 may be a physical device such as a microcomputer or a functional unit in software.

Drive Modes

As shown in FIG. 4, the control unit 40 includes a drive mode setting unit 24. Also, in the present embodiment, a drive mode selection button (not shown) is provided in the driver compartment of the tractor 1. When the worker operates the drive mode selection button, the drive mode setting unit 24 sets a drive mode of the travel device 10 during turning in accordance with the operation. When a drive mode is set, a predetermined signal is sent from the drive mode setting unit 24 to the travel control unit 28. During turning, the travel control unit 28 controls the travel device 10 in the set drive mode in accordance with the predetermined signal.

In the present embodiment, there are three types of drive modes, namely a first drive mode, a second drive mode, and a third drive mode. The first drive mode is a drive mode for executing high-speed rotation control, which is control in which the front wheels 11 rotate at a higher speed than the rear wheels 12, and inward brake control, which is control in which the rear wheel 12 on the inward side of the turn is subjected to braking. The second drive mode is a drive mode in which high-speed rotation control is executed and inward brake control is not executed. The third drive mode is a drive mode in which neither high-speed rotation control nor inward brake control is executed.

The turning radius of the tractor 1 in the second drive mode is larger than the turning radius of the tractor 1 in the first drive mode. The turning radius of the tractor 1 in the third drive mode is larger than the turning radius of the tractor 1 in the second drive mode.

In this way, the tractor 1 is configured such that the drive mode of the travel device 10 during turning can be changed.

Judgement Unit

As shown in FIG. 4, the control unit 40 includes a judgement unit 47. The judgement unit 47 is configured to judge whether to permit or prohibit outermost periphery automatic traveling. Note that outermost periphery automatic traveling is outermost periphery traveling performed by automatic travel.

A judgement result obtained by the judgement unit 47 is sent to the travel control unit 28. In the case where the received judgement result permits outermost periphery automatic traveling, the travel control unit 28 controls the travel device 10 and the fertilizer spraying device 30 such that outermost periphery automatic traveling is performed. Also, in the case where the received judgement result prohibits outermost periphery automatic traveling, the travel control unit 28 controls the travel device 10 and the fertilizer spraying device 30 such that outermost periphery automatic traveling is not performed.

In the case where outermost periphery automatic traveling is permitted by the judgement unit 47, work traveling by automatic travel may be performed over the entirety of the central region 51 and the outer peripheral region 52, for example.

In the case where outermost periphery automatic traveling is prohibited by the judgement unit 47, work traveling by automatic travel may be performed only in the central region 51, and not in the outer peripheral region 52, for example. Alternatively, work traveling by automatic travel may be performed over the entire portion of the agricultural field other than the outermost peripheral region 53.

The following describes the configuration of the judgement unit 47.

As shown in FIG. 4, the control unit 40 includes an overlap width determination unit 41 and a reference value determination unit 42. The overlap width determination unit 41 determines an overlap width D3 (see FIG. 3). The overlap width D3 is the width, in the front-rear direction in the first traveling during outermost periphery automatic traveling, of a region that is expected to be an overlap portion between the first work region 61 and the second work region 62 when outermost periphery automatic traveling is performed.

In other words, the control unit 40 includes the overlap width determination unit 41 that determines the overlap width D3, which is the width of the overlap portion between the region where work is performed by first traveling during outermost periphery automatic traveling and the region where work is performed by second traveling during the outermost periphery automatic traveling.

The overlap width determination unit 41 may be configured to determine the overlap width D3 by calculating the overlap width D3 based on the target routes generated by the route generation unit 27, the working width W1 of the fertilizer spraying device 30, and a reference position SP described later, for example.

The overlap width determination unit 41 sends information indicating the overlap width D3 to the reference value determination unit 42. The reference value determination unit 42 determines a reference value based on the received information. The reference value is a value corresponding to the working width W1 of the work device (the fertilizer spraying device 30 in the present embodiment).

In other words, the control unit 40 includes the reference value determination unit 42 that determines a reference value.

In the present embodiment, the reference value determination unit 42 determines the reference value by subtracting the overlap width D3 from the working width W1 of the fertilizer spraying device 30. However, the present invention is not limited to this. For example, the reference value determination unit 42 may determine the working width W1 of the fertilizer spraying device 30 as the reference value.

As shown in FIG. 4, the control unit 40 includes a reference position setting unit 43 and a reference distance calculation unit 44. Also, in the present embodiment, an operation panel (not shown) is provided in the driver compartment of the tractor 1. When the worker operates the operation panel, the reference position setting unit 43 sets a reference position SP (see FIG. 3) in response to the operation. In other words, the reference position SP can be changed by a manual operation.

The reference position SP is a position at which the fertilizer spraying device 30 is switched from the working state to the non-working state in automatic traveling.

Information indicating the set reference position SP is sent from the reference position setting unit 43 to the reference distance calculation unit 44. The reference distance calculation unit 44 calculates a reference distance D1 (see FIG. 3) based on the received information.

The reference distance D1 is the distance between the front end position of the tractor 1 and the reference position SP. In the example shown in FIG. 3, in the case where outermost periphery automatic traveling is performed, the reference distance D1 is the distance between the position where the front end portion of the tractor 1 is expected to be located at the end of the first traveling in the case where outermost periphery automatic traveling is performed and the reference position SP in the first traveling.

As shown in FIG. 4, the tractor 1 includes a sensor 9. The sensor 9 can detect an obstacle in front of the body. Note that the sensor 9 may be able to detect not only an obstacle in front of the body but also an obstacle on either side of the body or behind the body.

In other words, the tractor 1 includes the sensor 9 capable of detecting an obstacle in front of the body.

FIG. 3 shows a detection range DE of the sensor 9 and a detection distance D2 in the front-rear direction of the sensor 9. The detection distance D2 is the front-rear length of the detection range DE.

As shown in FIG. 4, the control unit 40 includes a sensor control unit 46. Also, in the present embodiment, an operation panel (not shown) is provided in the driver compartment of the tractor 1. When the worker operates the operation panel, the sensor control unit 46 switches the state of the sensor 9 between enabled and disabled in accordance with the operation. In other words, the sensor 9 is configured to be switchable between an enabled state and a disabled state.

As shown in FIG. 4, the control unit 40 includes a threshold value determination unit 45. The threshold value determination unit 45 receives information indicating the reference distance D1 from the reference distance calculation unit 44. The threshold value determination unit 45 also receives information indicating the state of the sensor 9 from the sensor control unit 46. The threshold value determination unit 45 determines a threshold value based on the reference distance D1 and the state of the sensor 9. Note that the determination of the threshold value will be described in detail later.

In this way, the threshold value determination unit 45 determines the threshold value based on the reference distance D1, which is the distance between the front end position of the tractor 1 and the reference position SP at which the fertilizer spraying device 30 is switched from the working state to the non-working state.

The judgement unit 47 receives information indicating the reference value from the reference value determination unit 42. Also, the judgement unit 47 receives information indicating the threshold value from the threshold value determination unit 45. A permission unit 48 in the judgement unit 47 then judges whether or not a first condition and a second condition are satisfied based on the reference value, the threshold value, and a lateral width W2 (see FIG. 3) of the fertilizer spraying device 30. Note that the lateral width W2 of the fertilizer spraying device 30 may be stored in the permission unit 48, for example.

The first condition is that the reference value, which is a value corresponding to the working width W1 of the fertilizer spraying device 30, is larger than the lateral width W2 of the fertilizer spraying device 30. The second condition is that the above-mentioned reference value is larger than the threshold value determined by the threshold value determination unit 45.

The permission unit 48 is configured to permit outermost periphery automatic traveling if at least both the first condition and the second condition are satisfied. In other words, the first condition and the second condition are permission conditions for outermost periphery automatic traveling. The permission unit 48 permits outermost periphery automatic traveling if all of the predetermined permission conditions are satisfied.

As described above, the control unit 40 includes the permission unit 48 that permits outermost periphery automatic traveling, which is outermost peripheral traveling performed by automatic travel, if predetermined permission conditions are satisfied. Also, the permission conditions include the first condition and the second condition.

As shown in FIG. 4, the judgement unit 47 includes a prohibition unit 49. The prohibition unit 49 prohibits outermost periphery automatic traveling if the permission unit 48 does not permit outermost periphery automatic traveling.

According to the configuration described above, the judgement unit 47 judges whether to permit or prohibit outermost periphery automatic traveling.

Judgement Flow and Threshold Value Determination Flow

Figure 5:
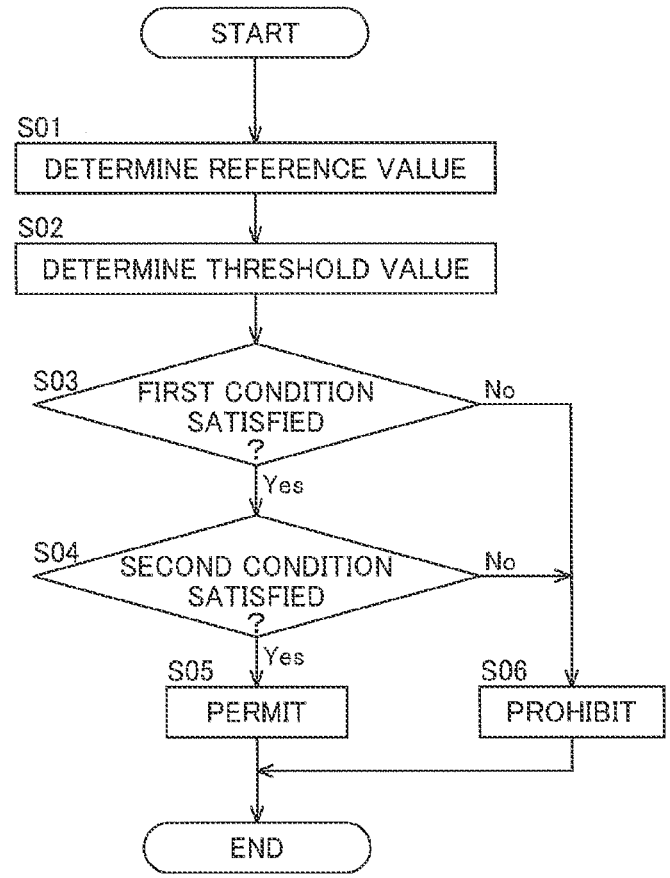
FIG. 5 is a flowchart of a judgement flow.

The control unit 40 is configured to judge whether to permit or prohibit outermost periphery automatic traveling in accordance with the judgement flow shown in FIG. 5. For example, the judgement flow may be executed before the tractor 1 starts work traveling in the agricultural field, but the present invention is not particularly limited to this.

When the judgement flow is started, first, the processing of step S01 is executed. In step S01, the reference value determination unit 42 determines the reference value.

Next, the processing of step S02 is executed. In step S02, the threshold value is determined by the threshold value determination unit 45 in accordance with the threshold value determination flow shown in FIG. 6.

When the threshold value determination flow is started, first, the processing of step S11 is executed. In step S11, the threshold value determination unit 45 judges whether or not the sensor 9 is in the enabled state based on information received from the sensor control unit 46. If it is judged that the sensor 9 is in the enabled state, the processing proceeds to step S12. If it is judged that the sensor 9 is not in the enabled state, the processing proceeds to step S13.

In step S12, the threshold value determination unit 45 determines the threshold value based on the reference distance D1 and the detection range DE of the sensor 9. More specifically, the threshold value determination unit 45 determines the sum of the reference distance D1 and the detection distance D2 of the sensor 9 in the front-rear direction as the threshold value. After that, the threshold value determination flow ends.

In other words, the threshold value determination unit 45 determines the threshold value based also on the detection range DE of the sensor 9. More specifically, if the sensor 9 is in the enabled state, the threshold value determination unit 45 determines the threshold value based also on the detection range DE of the sensor 9.

In step S13, the threshold value determination unit 45 determines the threshold value based on the reference distance D1. At this time, the threshold value determination unit 45 determines the threshold value without using the detection range DE of the sensor 9. More specifically, the threshold value determination unit 45 determines the reference distance D1 as the threshold value. After that, the threshold value determination flow ends.

In other words, If the sensor 9 is in the disabled state, the threshold value determination unit 45 determines the threshold value without using the detection range DE of the sensor 9.

After the threshold value is determined by the threshold value determination unit 45, the processing of step S03 of the judgement flow shown in FIG. 5 is executed. In step S03, the permission unit 48 judges whether or not the first condition is satisfied. If it is judged that the first condition is satisfied, the processing proceeds to step S04. If it is judged that the first condition is not satisfied, the processing proceeds to step S06.

In step S04, the permission unit 48 judges whether or not the second condition is satisfied. If it is judged that the second condition is satisfied, the processing proceeds to step S05. If it is judged that the second condition is not satisfied, the processing proceeds to step S06.

In step S05, the permission unit 48 permits outermost periphery automatic traveling. After that, the judgement flow ends.

In step S06, the prohibition unit 49 prohibits outermost periphery automatic traveling. After that, the judgement flow ends.

According to the configuration described above, if the reference value is larger than the lateral width W2 of the fertilizer spraying device 30, and furthermore the reference value is larger than the threshold value, outermost periphery automatic traveling is permitted.

If the reference value is larger than the lateral width W2 of the fertilizer spraying device 30, it is unlikely that the fertilizer spraying device 30 will travel out of the agricultural field and come into contact with a ridge when turning in a corner of the agricultural field. Also, if the reference value is larger than the threshold value, it is unlikely that an unworked region will appear between the region where work is performed in first traveling and the region where work is performed in second traveling.

Accordingly, if the first condition and the second condition are satisfied, it is likely that automatic travel can be performed in the outermost peripheral region 53 without the fertilizer spraying device 30 traveling out of the agricultural field and coming into contact with a ridge when turning in a corner of the agricultural field, and without an unworked region appearing between the region where work is performed in first traveling and the region where work is performed in second traveling. In other words, if the first condition and the second condition are satisfied, automatic travel is likely to be performed appropriately in the outermost peripheral region 53.

In other words, according to the configuration described above, outermost periphery automatic traveling is permitted under the condition that automatic travel is likely to be performed appropriately in the outermost peripheral region 53. In other words, according to the configuration described above, it is possible to realize the control unit 40 capable of executing automatic travel in the outermost peripheral region 53 under the condition that automatic travel is likely to be performed appropriately in the outermost peripheral region 53.

Figure 6:
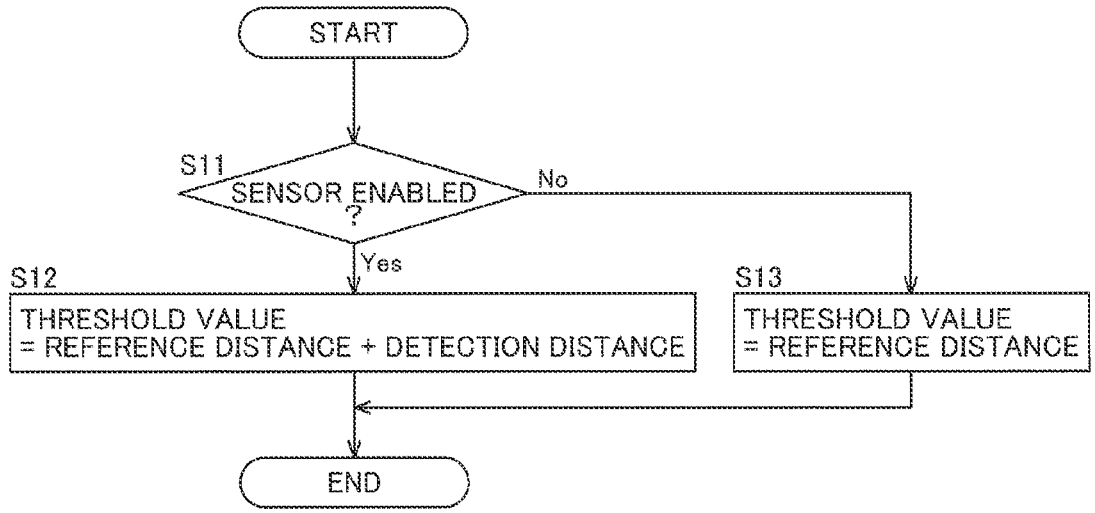
FIG. 6 is a flowchart of a threshold value determination flow.
Figure 7:
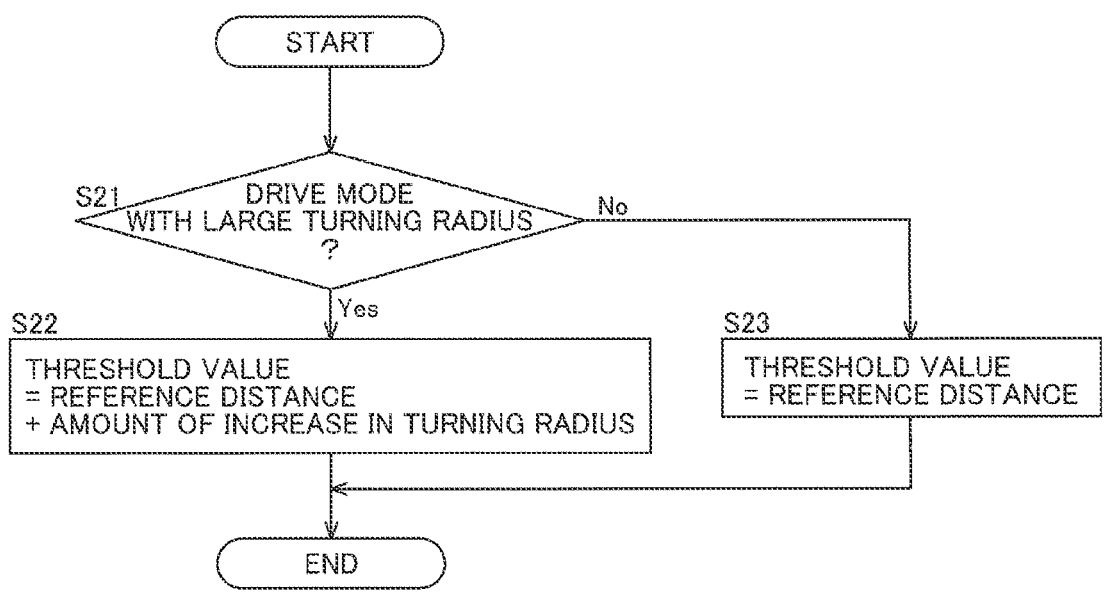
FIG. 7 is a flowchart of the threshold value determination flow in Variation 1.

Variations (1) The threshold value determination flow shown in FIG. 7 may be adopted instead of the threshold value determination flow shown in FIG. 6. When the threshold value determination flow shown in FIG. 7 is started, first, the processing of step S21 is executed. In step S21, the threshold value determination unit 45 judges whether or not the drive mode set by the drive mode setting unit 24 is a drive mode having a large turning radius.

More specifically, if the drive mode set by the drive mode setting unit 24 is the first drive mode, the judgement result is "No" in step S21, whereas if the drive mode set by the drive mode setting unit 24 is the second drive mode or the third drive mode, the judgement result is "Yes" in step S21.

If the judgement result is "Yes" in step S21, the processing proceeds to step S22. If the judgement result is "No" in step S21, the processing proceeds to step S23.

In step S22, the threshold value determination unit 45 calculates an amount of increase in the turning radius based on the set drive mode. The amount of increase in the turning radius is the difference between the turning radius in the set drive mode and the turning radius in the first drive mode. For example, if the set drive mode is the second drive mode, the amount of increase in the turning radius is a value obtained by subtracting the turning radius in the first drive mode from the turning radius in the second drive mode.

After the amount of increase in the turning radius is calculated, the threshold value determination unit 45 determines the sum of the reference distance D1 and the amount of increase in the turning radius as the threshold value. After that, the threshold value determination flow ends.

In step S23, the threshold value determination unit 45 determines the reference distance D1 as the threshold value. After that, the threshold value determination flow ends.

As described above, in the threshold value determination flow shown in FIG. 7, the threshold value is determined based on the drive mode set by the drive mode setting unit 24 and the turning radius. In other words, in this configuration, the threshold value determination unit 45 determines the threshold value based also on the turning radius of the tractor 1. Also, the threshold value determination unit 45 determines the threshold value based also on the drive mode.

(2) The travel device 10 may be a crawler type or a semi-crawler type.

(3) Instead of the fertilizer spraying device 30, a pesticide spraying device for spraying a pesticide, a sowing device for spraying seeds, or the like may be provided. All of such devices correspond to the "work device" pertaining to the present invention.

(4) The tractor 1 does not need to be equipped with the sensor 9.

(5) The sensor 9 does not need to be able to be switched to the disabled state.

(6) The permission unit 48 and the prohibition unit 49 may be constituted by a single member or functional unit. In other words, a single member or functional unit may have both the functionality of the permission unit 48 and the functionality of the prohibition unit 49.

It should be noted that the configurations disclosed in the above embodiment (including the variations, which similarly applies hereinafter) can be applied in combination with configurations disclosed in other embodiments as long as no contradiction arises. Moreover, the embodiments described in this specification are illustrative, the embodiments of the present invention are not limited to the above-described embodiments, and the embodiments can be appropriately modified without departing from the object of the present invention.

INDUSTRIAL APPLICABILITY

The present invention is applicable not only to tractors but also to various work vehicles such as combines and rice transplanters.

What is claimed is:

1. A travel control system that controls automatic travel of a work vehicle that includes a work device, wherein:
    the work vehicle is configured to perform outermost periphery traveling by automatic travel, and the outermost periphery traveling is work traveling performed along an outer shape of an agricultural field in an outermost peripheral region of the agricultural field, and
    the outermost periphery traveling includes a first traveling for traveling in a first direction while driving the work device, a second traveling for traveling in a second direction while driving the work device, and a direction change operation that is performed between the first traveling and the second traveling and is performed to change a direction of the work vehicle from the first direction to the second direction,
    the travel control system comprising a microcomputer comprising:
        a permission unit configured to permit outermost periphery automatic traveling, which is the outermost periphery traveling performed by automatic travel, in response to a first predetermined permission condition and a second predetermined permission condition being satisfied;
        a prohibition unit configured to prohibit the outermost periphery automatic traveling in response to the permission unit not permitting the outermost periphery automatic traveling; and
        a threshold value determination unit, and
    wherein:
        the first predetermined permission condition is that a reference value corresponding to a working width of the work device is larger than a lateral width of the work device,
        the second predetermined permission condition is that the reference value is larger than a threshold value determined by the threshold value determination unit, and
        the threshold value determination unit is configured to determine the threshold value based on a reference distance between a front end position of the work vehicle and a reference position at which the work device is switched from a working state to a non-working state.

2. The travel control system according to claim 1, wherein the work vehicle comprises a sensor configured to detect an obstacle in front of a body of the work vehicle, and wherein the threshold value determination unit determines the threshold value based also on a detection range of the sensor.

3. The travel control system according to claim 2, wherein:
the sensor is switchable between an enabled state and a disabled state,
in response to the sensor being in the enabled state, the threshold value determination unit determines the threshold value based also on the detection range of the sensor, and
in response to the sensor being in the disabled state, the threshold value determination unit determines the threshold value without using the detection range of the sensor.

4. The travel control system according to claim 1, wherein the threshold value determination unit determines the threshold value based also on a turning radius of the work vehicle.

5. The travel control system according to claim 2, wherein the threshold value determination unit determines the threshold value based also on a turning radius of the work vehicle.

6. The travel control system according to claim 3, wherein the threshold value determination unit determines the threshold value based also on a turning radius of the work vehicle.

7. The travel control system according to claim 1, wherein the work vehicle is configured to switch a drive mode of a travel device employed during turning, and
wherein the threshold value determination unit determines the threshold value based also on the drive mode.

8. The travel control system according to claim 2, wherein the work vehicle is configured to switch a drive mode of a travel device employed during turning, and
wherein the threshold value determination unit determines the threshold value based also on the drive mode.

9. The travel control system according to claim 3, wherein the work vehicle is configured to switch a drive mode of a travel device employed during turning, and
wherein the threshold value determination unit determines the threshold value based also on the drive mode.

10. The travel control system according to claim 4, wherein the work vehicle is configured to switch a drive mode of a travel device employed during turning, and
wherein the threshold value determination unit determines the threshold value based also on the drive mode.

11. The travel control system according to claim 5, wherein the work vehicle is configured to switch a drive mode of a travel device employed during turning, and
wherein the threshold value determination unit determines the threshold value based also on the drive mode.

12. The travel control system according to claim 6, wherein the work vehicle is configured to switch a drive mode of a travel device employed during turning, and
wherein the threshold value determination unit determines the threshold value based also on the drive mode.

13. The travel control system according to claim 1, wherein the microcomputer further comprises:
an overlap width determination unit configured to determine an overlap width that is a width of an overlap portion of a region where work is performed by the first traveling during the outermost periphery automatic traveling and a region where work is performed by the second traveling during the outermost periphery automatic traveling; and
a reference value determination unit configured to determine the reference value, and
wherein the reference value determination unit determines a value obtained by subtracting the overlap width from the working width of the work device as the reference value.

14. The travel control system according to claim 2, wherein the microcomputer further comprises:
an overlap width determination unit configured to determine an overlap width that is a width of an overlap portion of a region where work is performed by the first traveling during the outermost periphery automatic traveling and a region where work is performed by the second traveling during the outermost periphery automatic traveling; and
a reference value determination unit configured to determine the reference value, and
wherein the reference value determination unit determines a value obtained by subtracting the overlap width from the working width of the work device as the reference value.

15. The travel control system according to claim 3, wherein the microcomputer further comprises:
an overlap width determination unit configured to determine an overlap width that is a width of an overlap portion of a region where work is performed by the first traveling during the outermost periphery automatic traveling and a region where work is performed by the second traveling during the outermost periphery automatic traveling; and
a reference value determination unit configured to determine the reference value, and
wherein the reference value determination unit determines a value obtained by subtracting the overlap width from the working width of the work device as the reference value.

16. The travel control system according to claim 4, wherein the microcomputer further comprises:
an overlap width determination unit configured to determine an overlap width that is a width of an overlap portion of a region where work is performed by the first traveling during the outermost periphery automatic traveling and a region where work is performed by the second traveling during the outermost periphery automatic traveling; and
a reference value determination unit configured to determine the reference value, and
wherein the reference value determination unit determines a value obtained by subtracting the overlap width from the working width of the work device as the reference value.

17. The travel control system according to claim 5, wherein the microcomputer further comprises:
an overlap width determination unit configured to determine an overlap width that is a width of an overlap portion of a region where work is performed by the first traveling during the outermost periphery automatic traveling and a region where work is performed by the second traveling during the outermost periphery automatic traveling; and
a reference value determination unit configured to determine the reference value, and
wherein the reference value determination unit determines a value obtained by subtracting the overlap width from the working width of the work device as the reference value.

18. The travel control system according to claim 6, wherein the microcomputer further comprises:
- an overlap width determination unit configured to determine an overlap width that is a width of an overlap portion of a region where work is performed by the first traveling during the outermost periphery automatic traveling and a region where work is performed by the second traveling during the outermost periphery automatic traveling; and
- a reference value determination unit configured to determine the reference value, and
- wherein the reference value determination unit determines a value obtained by subtracting the overlap width from the working width of the work device as the reference value.

19. The travel control system according to claim 7, wherein the microcomputer further comprises:
- an overlap width determination unit configured to determine an overlap width that is a width of an overlap portion of a region where work is performed by the first traveling during the outermost periphery automatic traveling and a region where work is performed by the second traveling during the outermost periphery automatic traveling; and
- a reference value determination unit configured to determine the reference value, and
- wherein the reference value determination unit determines a value obtained by subtracting the overlap width from the working width of the work device as the reference value.

20. The travel control system according to claim 8, wherein the microcomputer further comprises:
- an overlap width determination unit configured to determine an overlap width that is a width of an overlap portion of a region where work is performed by the first traveling during the outermost periphery automatic traveling and a region where work is performed by the second traveling during the outermost periphery automatic traveling; and
- a reference value determination unit configured to determine the reference value, and
- wherein the reference value determination unit determines a value obtained by subtracting the overlap width from the working width of the work device as the reference value.

\* \* \* \* \*